US012579385B2

(12) United States Patent
Verma et al.

(10) Patent No.: US 12,579,385 B2
(45) Date of Patent: Mar. 17, 2026

(54) EMBEDDED TRANSLATE, SUMMARIZE, AND AUTO READ

(71) Applicant: Microsoft Technology Licensing, LLC, Redmond, WA (US)

(72) Inventors: Shveta Verma, Hyderabad (IN); Deepak Achuthan Menon, Hyderabad (IN); Amit Dangwal, Hyderabad (IN); Prakash Arjunan, Hyderabad (IN); Rupeshkumar Rasiklal Mehta, Hyderabad (IN); Kishor Chamua, Hyderabad (IN); Arijit Mukherjee, Uttarpara (IN); Shubham Bansal, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 18/518,786

(22) Filed: Nov. 24, 2023

(65) Prior Publication Data

US 2025/0173525 A1    May 29, 2025

(51) Int. Cl.
*G06F 40/58* (2020.01)
*G06F 40/263* (2020.01)

(52) U.S. Cl.
CPC ............ *G06F 40/58* (2020.01); *G06F 40/263* (2020.01)

(58) Field of Classification Search
CPC ............................... G06F 40/58; G06F 40/263
See application file for complete search history.

(56) References Cited

U.S. PATENT DOCUMENTS 8,239,762 B2    8/2012    Burstein et al.
9,965,466 B2    5/2018    Kidwai et al.
(Continued)

FOREIGN PATENT DOCUMENTS

IN      202241054214 A      10/2022

OTHER PUBLICATIONS

Costa-Jussa, et al., No Language Left Behind: Scaling Human-Centered Machine Translation, arXiv:2207.04672, 2022 (Year: 2022).*
(Continued)

*Primary Examiner* — Bhavesh M Mehta
*Assistant Examiner* — Eunice Lee
(74) *Attorney, Agent, or Firm* — NovoTechIP International PLLC

(57)    ABSTRACT

A method of facilitating consumption of online content includes receiving source text for a source article to be translated, the source text being in a source language. The source language for the source text and the target language to which the source text is to be translated are each identified. The source text, the source language, and the target language are each provided to a machine translation model which automatically generates translated text in the target language from the source text. The translated text is provided as input to a generative language model which generates summary text in the target language from the translated text. The summary text is provided to a text-to-speech model which generates summary audio from the summary text. The summary text and summary audio are then sent to a user interface via which the summary text is displayed, and playback of the summary audio is enabled.

20 Claims, 9 Drawing Sheets

(56) References Cited

U.S. PATENT DOCUMENTS

| | | | |
|---|---|---|---|
| 11,741,318 B2 * | 8/2023 | Kotnis ................... | G06N 3/045 |
| | | | 704/9 |
| 2016/0350288 A1 * | 12/2016 | Wick ...................... | G06F 40/44 |
| 2019/0197119 A1 * | 6/2019 | Zhang ..................... | G06F 16/35 |
| 2020/0210772 A1 * | 7/2020 | Bojar ..................... | G06F 40/58 |
| 2025/0045316 A1 * | 2/2025 | Lee ...................... | G06F 16/3344 |
| 2025/0054494 A1 * | 2/2025 | Gao ........................ | G06F 40/58 |

OTHER PUBLICATIONS

"Amazon Translate Features", Retrieved from: https://aws.amazon.com/translate/details/, Retrieved On: Sep. 18, 2023, 3 Pages.
"Text Reader (Text to Speech) TTS by Read me", Retrieved from: https://chrome.google.com/webstore/detail/text-reader-text-to-speec/npdkkcjlmhcnnaoobfdjndibfkkhhdfn, Jun. 12, 2023, 4 Pages.

* cited by examiner 300
302   304   306   308   310
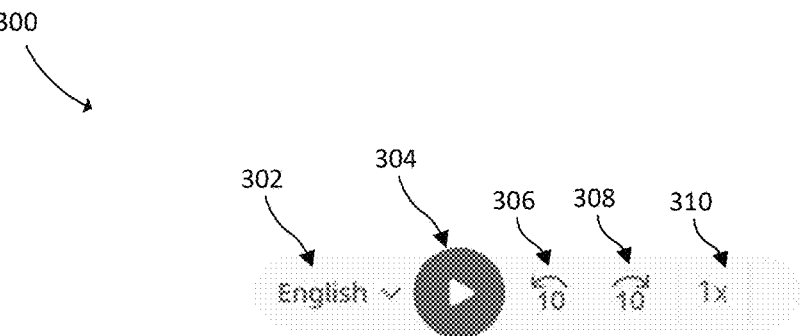
FIG. 3A
312
300
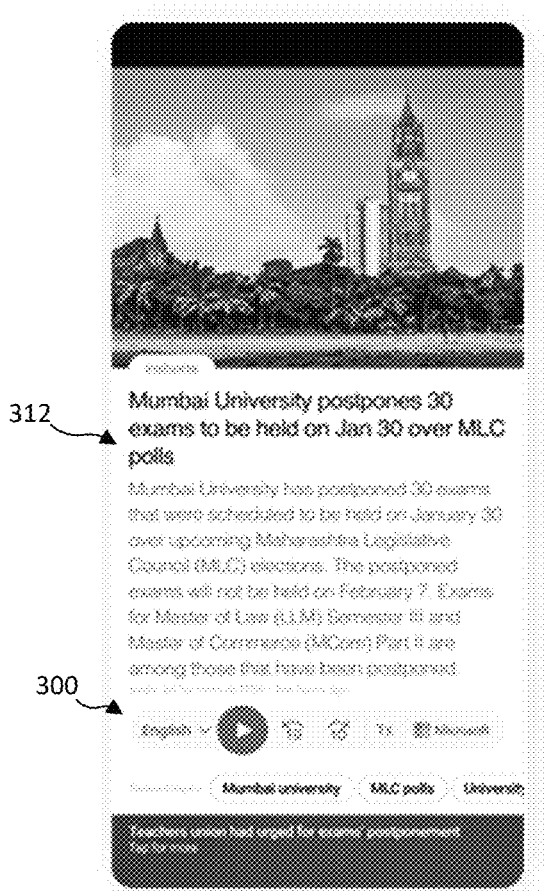
FIG. 3B
312
300
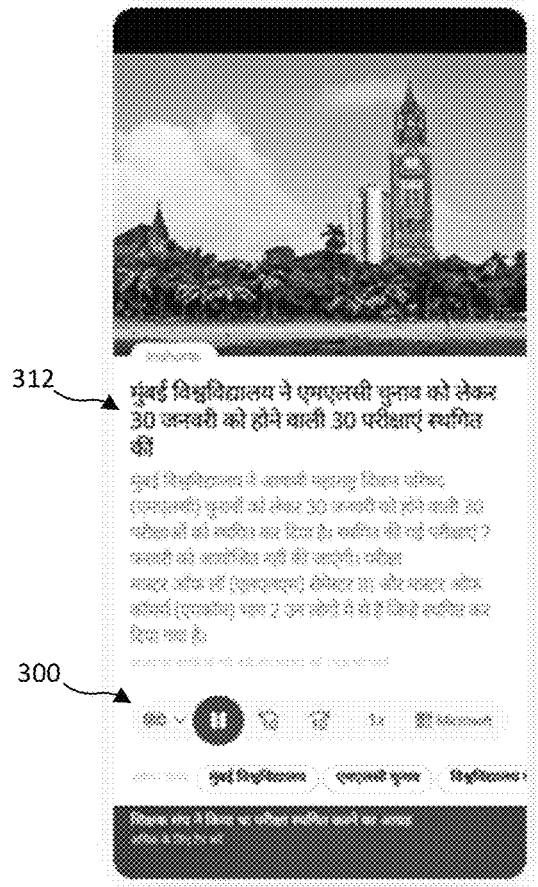
FIG. 3C

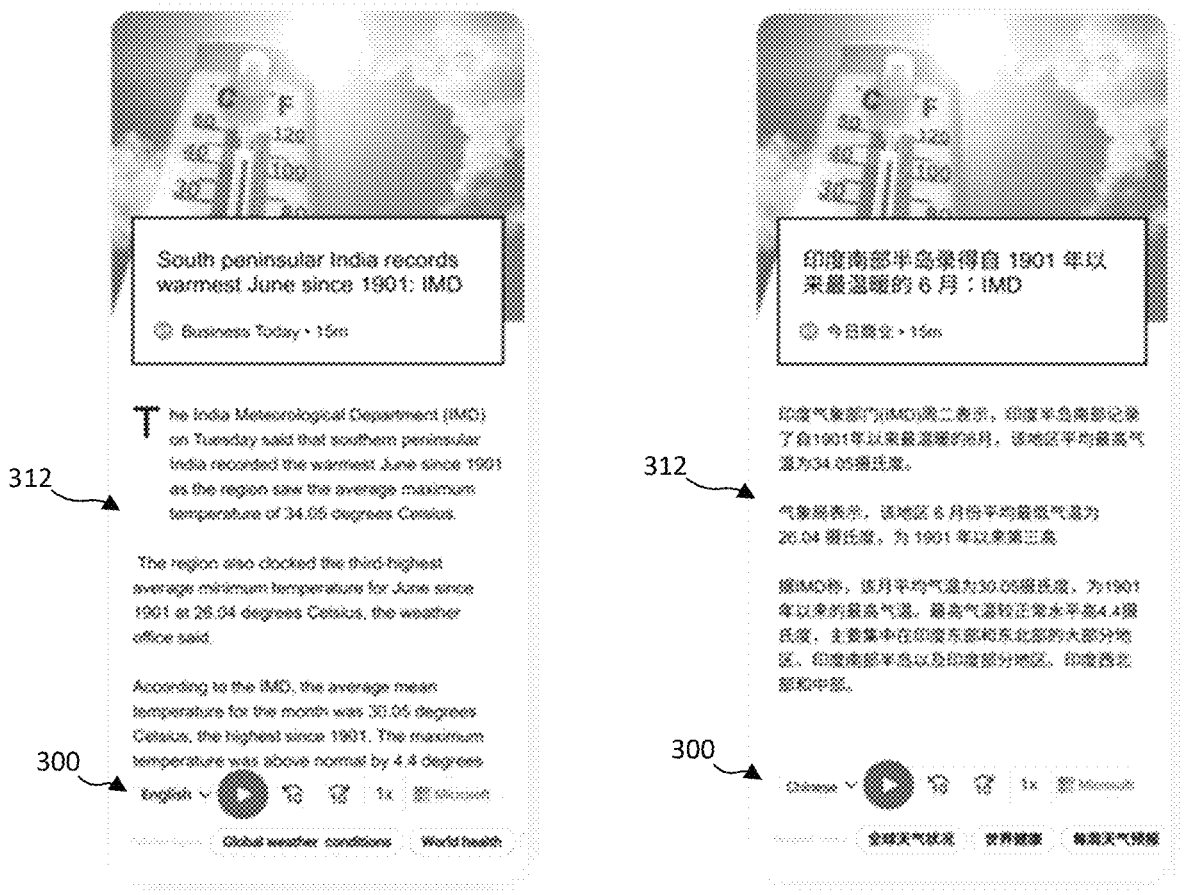
FIG. 3D          FIG. 3E

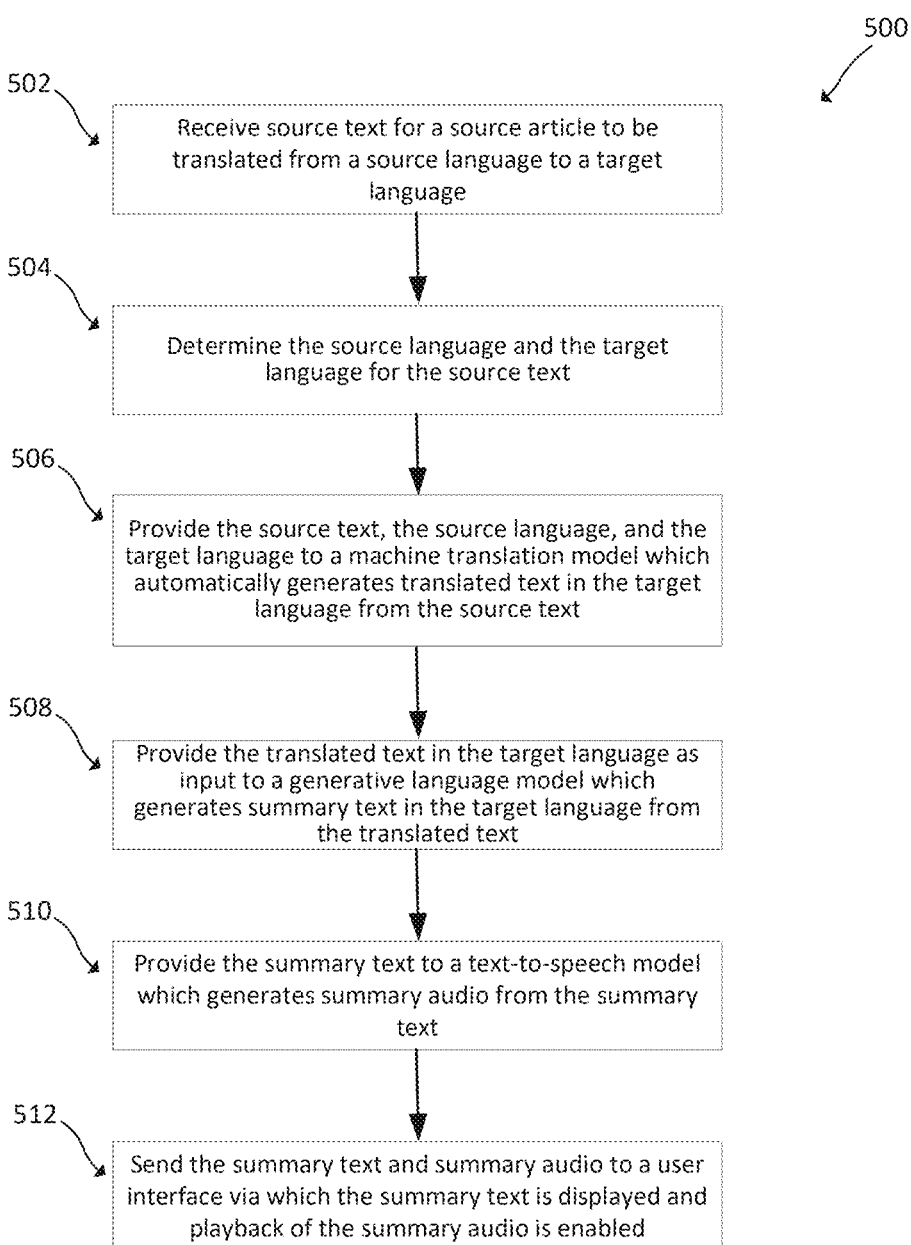

500

502 Receive source text for a source article to be translated from a source language to a target language 504 Determine the source language and the target language for the source text 506 Provide the source text, the source language, and the target language to a machine translation model which automatically generates translated text in the target language from the source text 508 Provide the translated text in the target language as input to a generative language model which generates summary text in the target language from the translated text 510 Provide the summary text to a text-to-speech model which generates summary audio from the summary text 512 Send the summary text and summary audio to a user interface via which the summary text is displayed and playback of the summary audio is enabled

FIG. 5

EMBEDDED TRANSLATE, SUMMARIZE, AND AUTO READ

BACKGROUND

The internet enables individuals to connect with others and access content from all corners of the globe. The internet has revolutionized the way we learn, work, and interact, making education accessible to all, enabling remote work, and bridging geographical divides. Due to global language diversity, online content in all languages is readily available to be consumed. Artificial intelligence (AI) techniques, such as machine translation and language models, have facilitated the consumption of content across language barriers through natural language processing (NLP) tasks such as automated translation and text summarization. However, these techniques are typically less effective for languages with relatively low amounts of textual data and resources to train the models (i.e., low-resource languages). The lack of available training data is particularly problematic for generative AI, such as large language models (LLMs) (e.g., ChatGPT), which are often used for text summarization tasks. As a result, there are languages that have AI available for translation tasks but lack suitable AI for summarization tasks.

Hence, what is needed are ways to facilitate the consumption of online content for low-resource languages that do not suffer from the limitations of the prior art.

SUMMARY

In one general aspect, the instant disclosure presents a translation, summarization, and auto-read system having a processor and a memory in communication with the processor wherein the memory stores executable instructions that, when executed by the processor alone or in combination with other processors, cause the translation, summarization, and auto-read system to perform multiple functions. The function may include receiving, at a control component from a user interface component, source text in a source language of an article to be translated and an indication of a target language for translating the source text; providing, from the control component to a source language identification component, the source text; receiving from the source language identification component a source language of the source text; providing, from a translation component to a machine translation model, the source text, the target language, and the source language; in response to providing the source text, the source language, and the target language to the machine translation model, receiving translated text of the article in the target language from the machine translation model; determining, using the control component, whether the target language is supported by generative model summarization; in response to determining that the target language is supported by generative model summarization: providing, from a summarization component to a generative summarization model trained in the target language, the translated text; and in response to providing the translated text to the generative summarization model trained in the target language, receiving an extractive summary of the article in the target language from the generative summarization model trained in the target language; in response to determining that the target language is not supported by generative model summarization: providing, from the summarization component to a generative summarization model trained in the source language, the source text of the article in the source language; in response to providing the source text of the article in the source language to the generative summarization model trained in the source language, receiving an extractive summary of the article in the source language from the generative summarization model trained in the source language; and converting, by the control component, the extractive summary in the source language to the extractive summary in the target language; providing, from the control component to a text-to-speech model, the extractive summary in the target language; in response to providing the extractive summary to the text-to-speech model, receiving summary audio for in the target language from the text-to-speech model; providing, from the control component to a user interface, the extractive summary in the target language and the summary audio; and causing a display of the extractive summary in the target language and playback of the summary audio in the user interface.

In yet another general aspect, the instant disclosure presents a method for summarizing online content that reduces network bandwidth and computation resources associated with translation and summarization of an online content. The method includes receiving, at a control component from a user interface component, source text in a source language of an article to be translated; providing, from the control component to a source language identification component, the source text; receiving a source language of the source text from the source language identification component; determining, using the control component, an intermediate language for summarization of the source text; providing, from a translation component to a machine translation model trained in the intermediate language, the source text; receiving translated text of the article in the intermediate language from the machine translation model; providing, from a summarization component to a generative summarization model trained in the intermediate language, the translated text of the article in the intermediate language; receiving a summary of the article in the intermediate language from the generative summarization model; providing, from the translation component to the machine translation model, the summary in the intermediate language; receiving a summary of the article in the source language from the machine translation model; providing, from an auto-read component to a text-to-speech model, the summary in the source language; in response to providing the summary in the source language from the auto-read component to the text-to-speech model, receiving summary audio in the source language; and providing, from the control component to a user interface, the summary in the source language and the summary audio; and displaying the summary in the source language and enabling playback of the summary audio in a user interface.

In a further general aspect, the instant application describes a non-transitory computer readable medium on which are stored instructions that when executed cause a programmable device to perform functions of receiving, at a control component from a user interface component, source text in a source language of an article to be translated and an indication of a target language for translating the source text; providing, from the control component to a source language identification component, the source text; in response to providing the source text to the source language identification component, receiving from the source language identification component a source language of the source text; determining, using the control component, whether the target language is supported by generative model summarization; providing, from a translation component to a machine translation model, the source text, the target language, and the source language; in response to providing the source text, the source language, and the target language to the machine translation model, receiving translated text of the article in the target language from the machine translation model; in response to determining that the target language is supported by generative model summarization: providing, from a summarization component to a generative summarization model trained in the target language, the translated text; in response to providing the translated text to the generative summarization model trained in the target language, receiving an extractive summary of the article in the target language; in response to determining that the target language is not supported by generative model summarization: providing, from the summarization component to a generative summarization model trained in the source language, the source text of the article in the source language; in response to providing the source text of the article in the source language to the generative summarization model trained in the source language, receiving an extractive summary of the article in the source language; and converting, by the control component, the extractive summary in the source language to the extractive summary in the target language; providing, from the control component to a text-to-speech model, the extractive summary in the target language; in response to providing the extractive summary to the text-to-speech model, receiving summary audio for in the target language from the text-to-speech model; providing, from the control component to a user interface, the extractive summary in the target language and the summary audio; and causing the extractive summary in the target language to be displayed and the summary audio to be played in a user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3A shows an example implementation of a user interface component for the translation, summarization, and auto-read system of FIG. 2.

FIGS. 3B and 3C depict a first example of the user interface component of FIG. 3A being used in association with a source article in a source language and the summary text/audio generated for the source article, respectively.

FIGS. 3D and 3E depict a second example of the user interface component of FIG. 3A being used in association with a source article in a source language and the summary text/audio generated for the source article, respectively.

FIG. 5 shows a flowchart of an example method of facilitating consumption of online content using a translation, summarization, and auto-read system of the instant disclosure.

DETAILED DESCRIPTION

Figure 1:
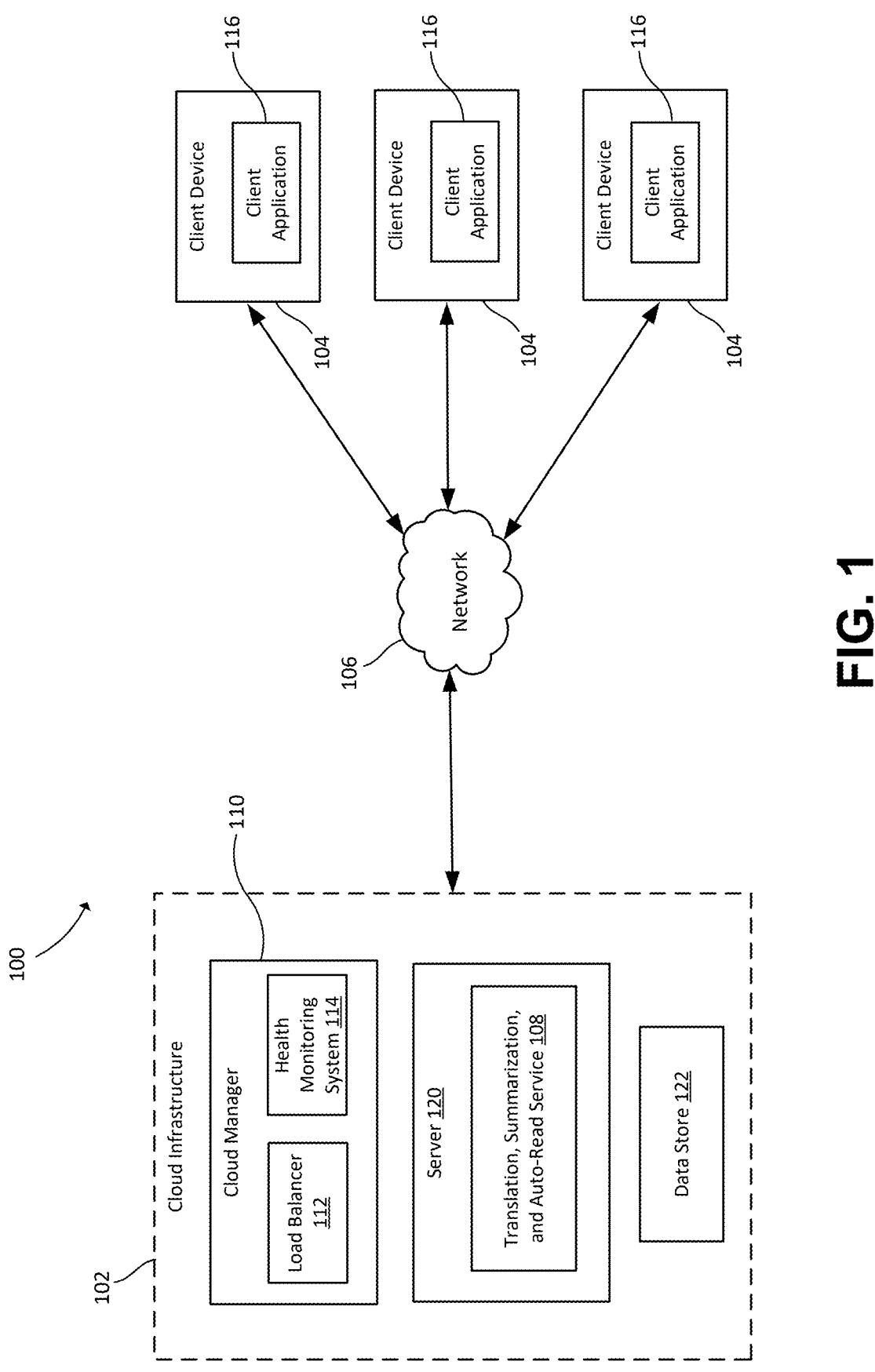
FIG. 1 is a diagram showing an example computing environment in which the techniques disclosed herein may be implemented.

The internet is the cornerstone of modern communication, information dissemination, and global connectivity. It serves as a platform for the exchange of ideas, creativity, and political discourse while fostering collaboration, diversity, and access to information and opportunities on a global scale. However, one major issue faced in accessing and consuming online content generated by people from all corners of the globe is global language diversity. People that generate online content typically generate the content in their native tongue or a secondary language in which they are proficient. Today's increasingly interconnected world therefore has made the ability to effectively consume content across language barriers more important than ever.

Artificial intelligence (AI) models, through natural language processing (NLP) tasks such as automated translation and text summarization, have facilitated the consumption of content across language barriers. Automated translation is typically performed using machine translation models, which are trained to translate text from one language to another using rule-based, statistical, and/or neural-network-based methods. Automated text summarization tasks are typically performed using generative AI, such as LLMs. LLMs are trained using massive amounts of textual data which enables the models to perform a number of NLP tasks, such as answering questions, generating new content from a prompt, and summarizing existing content. LLMs for text summarization can use an abstractive or an extractive summarization technique to summarize text. Abstractive summarization involves generating new sentences that are not directly copied from the source text to create the summary. Extractive summarization involves selecting the most relevant sentences from a text as a summary.

The effectiveness of machine translation models and language models depends on the amount of training data available to train the models. Languages having large amounts of available text and resources for training models (also referred to as high-resource languages), such as English, Chinese, French, German, Spanish, etc., enable models to be trained with a sufficient amount of training data to produce accurate and reliable results. Conversely, low-resource languages may not have a sufficient amount of data for training purposes. The lack of available training data is particularly problematic for generative AI, such as LLMs, which require massive amounts of data for training. As a result, some low-resource languages may not have a suitable AI for text summarization which can limit the ability of users to consume content in these languages.

To address these technical problems and more, in an example, this description provides technical solutions in the form of a system that provides automated translation, summarization, and read-out functionality for online content in many different languages, including languages that do not have generative AI for summarization tasks. The system utilizes a machine translation model for performing translation tasks, a generative language model (e.g., LLM) for performing summarization tasks, and a text-to-speech (TTS) model for generating audio of summary text for read out. The system enables summaries of text to be generated in substantially any language that has available translation resources regardless of whether generative AI has been trained in that language.

For example, the system can be used to translate articles from a source language to a target language and generate a summary of the article in the target language even if the target language is a low-resource language which has no generative AI available that has been trained in that language. This involves performing a sentence-to-sentence translation of the article from the source language to the target language. Each source language sentence and its associated target language sentence are stored in association with each other or linked in some manner so that the target language sentence corresponding to each source language sentence can be easily identified/located. For example, each source language sentence and target language sentence can include an index number which indicates the order or position of the sentence relative to the other sentences in article.

A generative AI, such as an LLM, is then used to generate a summary of the source article. An LLM refers to a machine learning model that has been trained on vast amounts of text data to understand and generate human language. These models are designed to process and generate natural language text and can perform a wide range of language-related tasks, such as text generation, language translation, sentiment analysis, text summarization, and more. LLMs are typically characterized by their size and complexity, as well as their ability to generate coherent and contextually relevant text. Examples of LLMs that may be used for summarization tasks include GPT-3, GPT-4, ChatGPT, and the like. The generative AI in this case generates an summarization of the source article in the source language. In some implementations, extractive summarization is used to generate the summary. Extractive summarization involves picking the most relevant sentences, e.g., top k most relevant, from an article and systematically organizing them. The sentences making up the summary are taken verbatim from the source article. The source language sentences selected for the source language summary are then used to identify the corresponding target language sentences which are then compiled in the same order as the sentences in the source language summary to generate an extractive summary of the article in the target language. In other implementations, abstractive summarization is used to generate the summary. Abstractive summarization is generating new content (e.g., sentences) that summarizes the text in the original article. In this case, the generative AI generates the abstractive summarization in the source language. The summary is then provided to the translation component for translation into the target language. In either case, the summary in the target language can then be displayed in the user interface. The summary is also provided to the TTS model which generates the audio of the summary in the target language which is also provided to the user interface for playback.

The system enables translation of articles from a source language to a target language where neither the source language nor the target language have a generative AI to use for summarization as long as machine translation can be used to translate both the source language and target language. In this case, the article in the source language is provided to the machine translation model which translates the article from the source language to an intermediate language which does have a generative AI support. The generative AI generates a summary of the source article in the intermediate language. The summary in the intermediate language is then provided to the machine translation model which translates the summary into the target language. The summary in the target language is then displayed in the user interface and provided to the TTS model to generate the audio of the summary in the target language for playback.

The system also enables summarizations of articles where translation is not requested but the article is in a language which is not supported by generative AI. In this case, the source article is translated from the source language to an intermediate language which is supported by generative AI summarization. The article translation in the intermediate language is then provided to a generative AI trained in the intermediate language which generates a summary of the article in the intermediate language. This summary can be abstractive or extractive. The summary in the intermediate language is then translated back to the source language. The summary in the source language is then displayed in the user interface and provided to the TTS model to generate the audio of the summary in the source language for playback.

In some cases, the system can elect to use an intermediate language for summarization even if there is a generative AI capable of generating summaries in the source language. For example, the accuracy levels of generative AIs in generating summaries for different languages and/or the difficulty levels of generating summaries of different languages can be taken into consideration in determining whether to use an intermediate language for summarization and/or which language to use for the intermediate language. The system can determine whether or not to use an intermediate language and which intermediate language to use for translation based on the source language (and target language in cases when translation to a target language is required) in any suitable manner.

The translation and summarization functionality enabled by the system of the instant disclosure enables automatic summarization of articles in substantially any language that is capable of translation. This in turn provides the technical advantage of facilitating accessibility and consumption of online content in low-resource languages where summarization has previously not been available. In addition, having the ability to select an intermediate language for translation provides technical advantages, such as improving accuracy of translation/summarization, decreasing processing times for translation/summarization, and the like. The improved accuracy also can reduce network bandwidth and computation resources associated with repeated prompting by the user due to inadequate translation and summarization.

The technical solutions described herein address the technical problems associated with facilitating the accessibility and consumption of online content that is provided in low-resource languages. The translation and summarization functionality enabled by the system of the instant disclosure enables automatic summarization of articles in substantially any language that is capable of translation provides the technical advantage of facilitating accessibility and consumption of online content in low-resource languages where summarization has previously not been available. In addition, having the ability to select an intermediate language for translation provides technical advantages, such as improving accuracy of translation/summarization, decreasing processing times for translation/summarization, and the like. The improved accuracy also can reduce network bandwidth and computation resources associated with repeated prompting by the user due to inadequate translation and summarization. The system empowers users to overcome language barriers and access information in a manner that suits their preferences and requirements. The system allows users to consume information in their preferred language and makes the information more accessible by introducing voice read out functionality. The system also provides targeted seamless interventions for addressing language illiteracy which empower users to consume information either in the form of readable text or consumable audio content in preferred or known language.

FIG. 1 is a diagram showing an example computing environment 100 in which aspects of the disclosure may be implemented. Computing environment 100 includes cloud infrastructure 102, client devices 104, and a network 106. The network 106 includes one or more wired and/or wireless networks. In embodiments, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate.

The cloud infrastructure 102 is configured to provide one or more cloud computing services and/or distributed computing services to users over the network 106. The computing services include a translation, summarization, and auto-read service 108 (explained in more detail below). Cloud infrastructure 102 may provide other services, such as hosting applications, user authentication, file storage, system updates, and the like. Cloud infrastructure 102 includes one or more servers 120 which are configured to provide computational and storage resources for the translation, summarization, and auto-read service 108. Servers are implemented using any suitable number and type of physical and/or virtual computing resources (e.g., standalone computing devices, blade servers, virtual machines, etc.). Cloud infrastructure 102 may also include one or more data stores 122 for storing data, programs, and the like for implementing and managing the translation, summarization, and auto-read service 108. In FIG. 1, one server 120 and one data store 122 are shown although any suitable number of servers and/or data stores may be utilized.

Cloud infrastructure 102 includes a cloud manager 110 for managing various aspects of the cloud infrastructure, such as deploying, configuring, and managing physical and/or virtual machines. Cloud manager 110 includes a load balancer 112 for distributing requests and workloads among server farms and/or among servers of a server farm. The load balancer 112 utilizes parameters such as load, number of connections, and server performance, to determine where to distribute the requests and workloads. Cloud manager 110 also includes a health monitoring system 114 configured to monitor the health of physical and virtual resources. and identify faulty components so that remedial action can be taken.

Client devices 104 enable users to access the services provided by the cloud infrastructure 102 via the network 106, such as the translation, summarization, and auto-read service 108. Client devices 104 can be any suitable type of computing device, such as personal computers, desktop computers, laptop computers, smart phones, tablets, gaming consoles, smart televisions and the like. Client devices 104 include one or more client (software) applications that are configured to interact with services made available by cloud infrastructure 102. For example, client devices 104 include client applications 116 which enable users to interact with the translation, summarization, and auto-read service 108. In some implementations, client application 116 is implemented as an add-on, plug-in, or the like which is integrated into one or more third-party applications to provide the translation, summarization, and auto-read service. In other implementations, client application 116 is a stand-alone application which is registered in the operating system and configured to be called to provide the functionality to other applications installed on the device.

Figure 2:
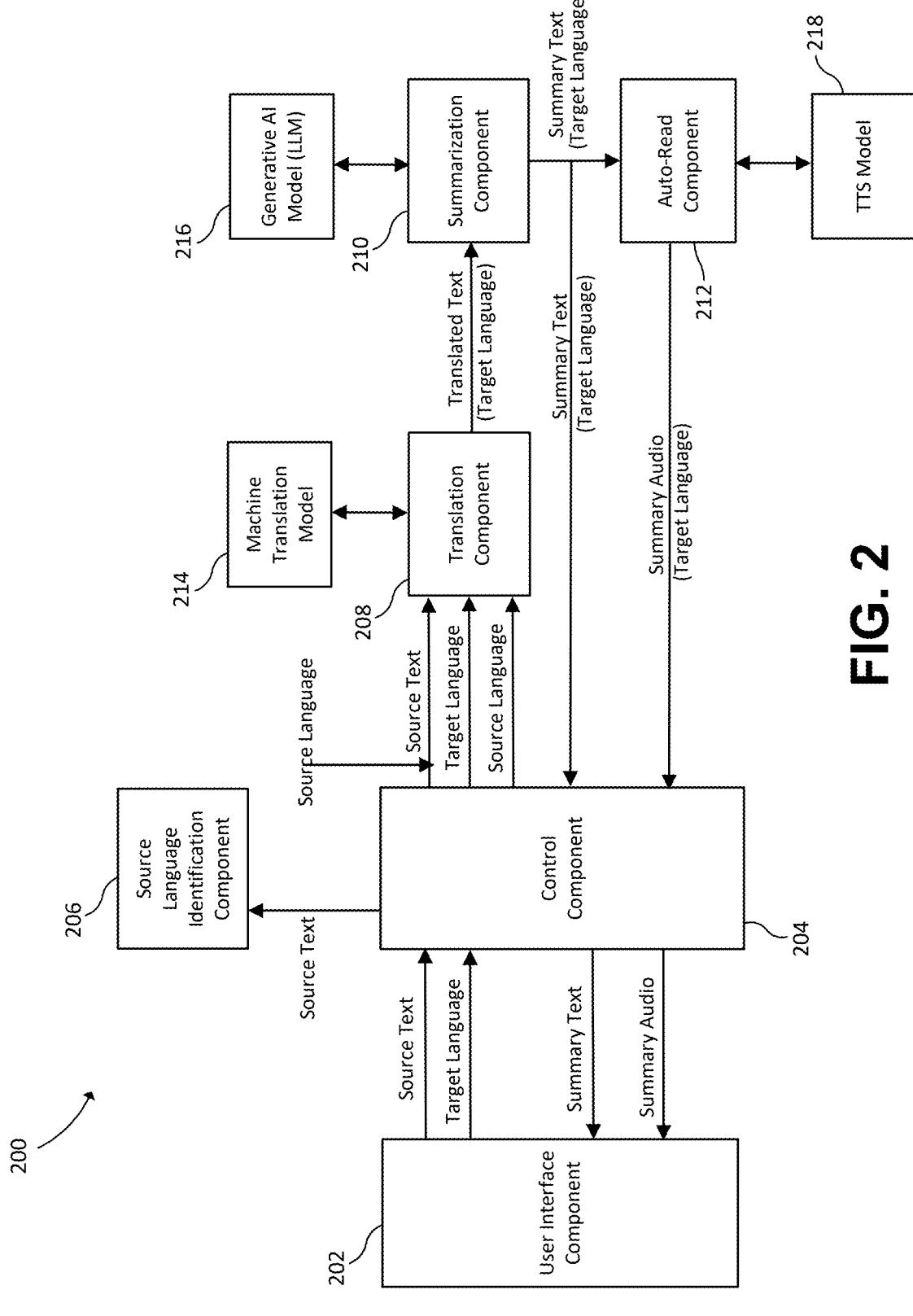
FIG. 2 depicts an example implementation of a translation, summarization, and auto-read system which may be implemented in the computing environment of FIG. 1.

In accordance with the disclosure, the translation, summarization, and auto-read service includes a system for implementing the translation, summarization, and auto-read functionality of the service. An example implementation of a translation, summarization, and auto-read system 200 is shown in FIG. 2. The system 200 includes a user interface component 202, a control component 204, a source language identification component 206, a translation component 208, a summarization component 210, and an auto-read component 212. These components may be implemented on one or more computing devices (e.g., servers, personal computers, and the like). In some implementations, one or more components, such as the translation, summarization, and auto-read components, may be implemented as stand-alone services which communicate relevant information via a network.

The user interface component 202 provides a user interface (UI) having UI controls (e.g., text entry fields, list boxes, dropdown lists, checkboxes, buttons, etc.) for activating the translation, summarization, and auto-read functionality, indicating and/or selecting a target language, and providing audio control functionality for the system. An example implementation of a UI 300 for the system is shown in FIG. 3A. The UI 300 comprises a UI element resembling a toolbar that includes UI controls for controlling playback of summary audio generated for a source article. In the example of FIG. 3A, the UI 300 includes a target language selector control 302, a play button 304, controls 306 and 308 for reversing and advancing playback (e.g., 10 seconds), respectively, and a speed control 310. FIGS. 3B and 3C show an example of the UI 300 in use for a situation in which a user that is only able to speak and understand Hindi receives a link to a website that is in English. FIG. 3B shows the article in English, and FIG. 3C shows the summarization of the article that has been generated for the article in Hindi. The UI 300 is displayed on a display screen in a display region 312, such as a window, in which the article is shown. The user can select the target language, e.g., Hindi, and control the playback of the summary audio using the UI 300. The display region 312 can be a component of the UI for the system or can be a window for a separate application which the UI 300 is configured to work with. In FIG. 3B, a source article in the English language is shown in the display region 312. FIG. 3C shows the summary text that has been generated in Hindi for the source article, and the UI 300 is shown in a state in which the summary audio for the source article is being played. FIGS. 3D and 3E show another example of the UI 300 in use. In this example, a user that is capable of reading English but is more comfortable comprehending content in Chinese receives a link to a website which is in English, as shown in FIG. 3D. FIG. 3E shows the summary text that has been generated in Chinese for the source article, and the UI 300 is shown in a state in which the summary audio for the source article is being played. The UI 300 enables the user to choose to listen to the content in their preferred language for better comprehension.

Returning to FIG. 2, the control component 204 receives the source text and a target language designation from the user interface component 202. The target language may be identified in any suitable manner. For example, the target language may initially correspond to the default language of client device, or operating system installed on the client device. The user interface component may also enable the selection of a target language via the UI (Sec, e.g., UI 300, FIG. 3). The control component 204 controls the transfer of relevant data to the other components of the system to generate the summary text and summary audio in the target language and returns the summary text and summary audio to the user interface component 202. In the example of FIG. 2, the control component 204 provides the source text to the source language identification component 206 which identifies the language of the source text. The source language identification component 206 may be configured to identify the source language in any suitable manner. The control component 202 then provides the source text, the source language, and the target language to the translation component 208.

The translation component 208 includes a machine translation (MT) model 214 which receives the source text, source language, and target language as input, translates the source text from the source language to the target language, and provides the translated text as an output. The MT model 214 can be configured to translate the source text using any suitable machine translation technique, such as Rules-Based Machine Translation (RBMT), Statistical Machine Translation (SMT), Neural Machine Translation (NMT), and the like, to translate the source text. In various embodiments, the MT model 214 is trained to generate a sentence-to-sentence translation of the input text such that there is a target language sentence for every source language sentence in the article. In this case, the source article can be parsed into sentences and stored in a manner that enables the order of the sentences with respect to each other to be identified and preserved. For example, the sentences can be stored in an array where the position in the array indicates the order or position of the sentence in the source article. The translated sentences can be stored in the same or similar manner so that the order of the translated sentences with respect to each other is maintained and identifiable. This in turn enables the identification of which translated sentence.

The translated text in the target language is then provided to the summarization component 210. The summarization component 210 includes a generative language model 216 that has been trained to generate a summary of input text in the target language. In various implementations, the generative language model 216 is trained to generate an extractive summarization of the input text. Extractive summarization involves picking the most relevant sentences from an article and systematically organizing them. The sentences making up the summary are taken verbatim from the text being summarized. Extractive summarization utilizes three fundamental operations: (1) Construction of an intermediate representation of the input text; (2) Scoring the sentences based on the representation; and (3) Selection of a summary comprising several sentences. Intermediate representations can be topic-based or indicator-based representations. At the time of the generation of the intermediate representation, each sentence is given a significance score. When using a method that relies on topic representation, a sentence's score reflects how effectively it elucidates critical concepts in the text. In indicator representation, the score is computed by aggregating the evidence from different weighted indicators. To generate a summary, a summarizer application picks the top k sentences. For example, some methods use greedy algorithms to pick and choose which sentences are most relevant, while others may transform sentence selection into an optimization problem in which a set of sentences is selected under the stipulation that it must maximize overall importance and coherence while minimizing the quantity of redundant information. In some implementations, the summary is an abstractive summary. In this case, the generative language model 216 may be trained to summarize text by rewording, paraphrasing, combining, and reordering phrases, concepts, key ideas, and the like which results in a summary that includes original content, rather than sentences taken from the text verbatim. In various implementations, the generative language model 216 is an LLM. Examples of LLMs include, but are not limited to, GPT-based models, e.g., GPT-3, GPT-4, ChatGPT, and the like. In other embodiments, any suitable type and number of language learning/processing model may be utilized.

The summary text generated by the summarization component 210 is provided as an input to the auto-read component 212 which generates summary audio from the summary text. The auto-read component 210 includes a TTS model 218 that has been trained to convert written text in the target language into spoken words in the target language. The goal is to generate synthetic speech that sounds natural and resembles human speech as closely as possible. In general, the TTS model 218 includes a text analysis module that converts a text sequence into linguistic features. An acoustic model then generates acoustic features from those linguistic features. Finally, a vocoder synthesizes a waveform from those acoustic features that is the audio for the spoken words for the written text. The TTS model can be implemented using a generative language model, such as an LLM. Any suitable type and/or number of generative language models may be utilized for text-to-speech processing.

The summary audio generated by the TTS model 218 is returned to the control component 204 along with the summary text generated by the summarization component 210. The control component 204 then returns the summary text and summary audio to the user interface component 202 where the summary text is displayed in the UI of client application for the translation, summarization, and auto-read system (See, e.g., FIGS. 3C, 3E). The summary audio is provided to the UI where the playback can be controlled by a UI element, such as the UI 300 of FIG. 3.

Figure 4A:
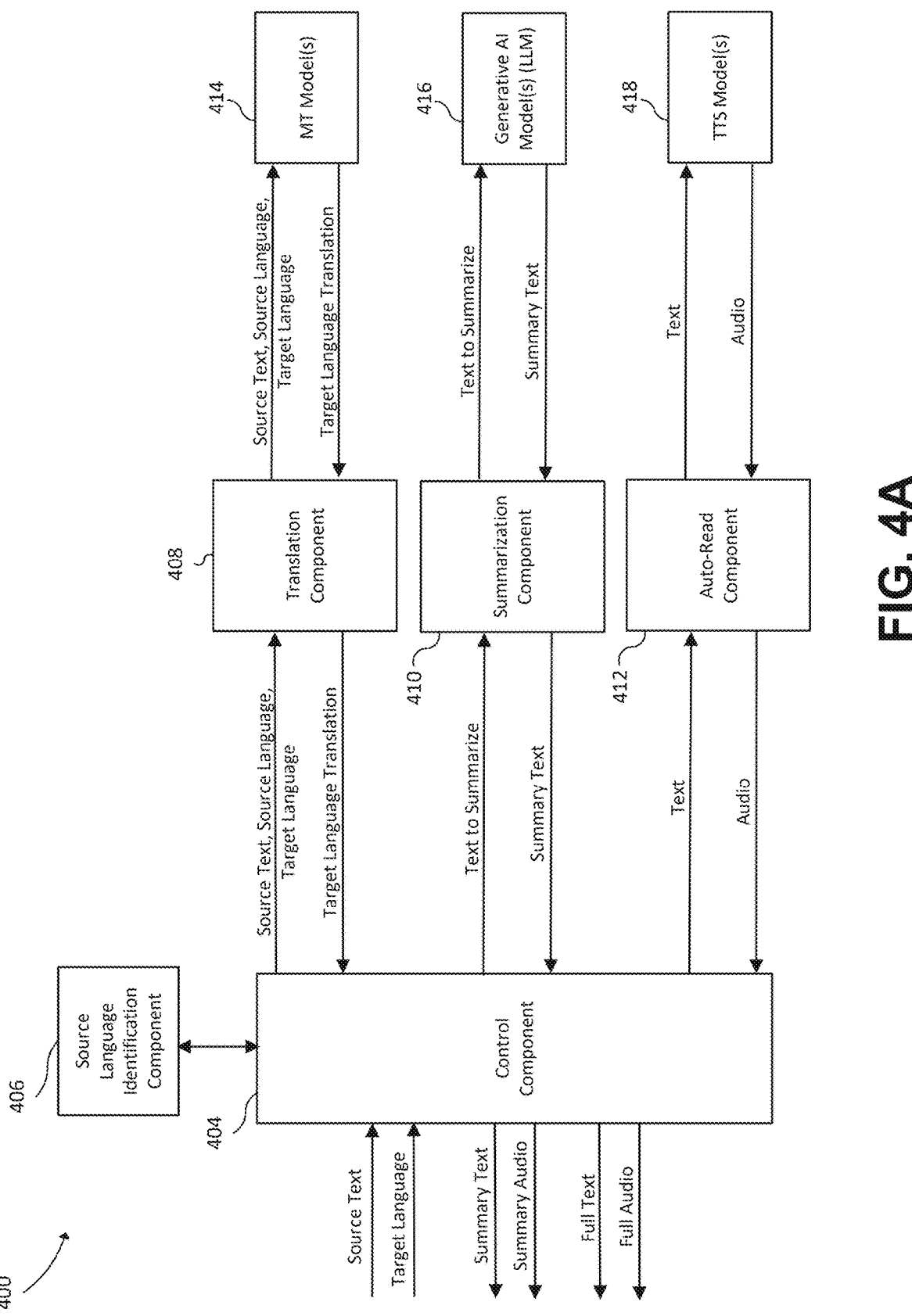
FIG. 4A shows another example implementation of a translation, summarization, and auto-read system which may be implemented in the computing environment of FIG. 1.

FIG. 4A shows another example implementation of a translation, summarization, and auto-read system 400. The system 400 includes a user interface component 404, a source language identification component 406, a translation component 408, a summarization component 410, and an auto-read component 412 (the user interface component is not shown in FIG. 4A). FIG. 4A shows an implementation in which the full translated text and the full audio of the translated text is provided to the control component 404 and returned to a user interface component (not shown) where the summary text, summary audio, full text, and full audio generated for the source article can be displayed/played for a user. In this implementation, a UI component for the system includes UI controls that enable selection and display/playback of the full text translation and/or the full audio translation for the source article.

Figure 4B:
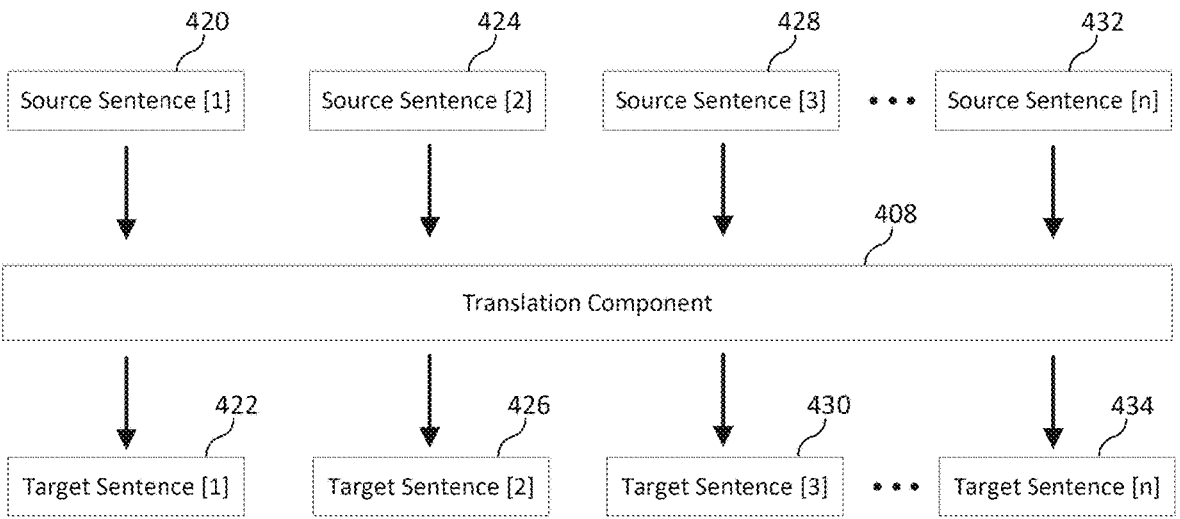
FIG. 4B shows an example of sentence-to-sentence translation of source text to a target language.

As noted above, the system enables translation, summarization, and audio when either the source language, the target language, or both the target language and the source language is a language that does not have a suitable generative AI for generating summaries, such as a low-resource language. The control component 404 is configured to determine whether the source language and/or the target language is supported by the generative AI of the system. If the source or target language is not supported, the control component is configured to coordinate the translation and summarization using an intermediate language for summarization. For example, when the control component 404 identifies that the target language is not supported by the generative AI model(s) 416, the control component 404 is configured to cause the translation component 408 to generate a sentence-to-sentence translation of the source text to the target language. As shown in FIG. 4B, the translation component 408 generates a translated sentence in the target language for each sentence in the source language. In particular, the first source sentence 420 is translated into the first target sentence 422, the second source sentence 424 is translated into the second target sentence 426, the third source sentence 428 is translated into third target sentence 430, and this is repeated until the last source sentence 432 is translated into the last target sentence 434. The source sentences and target sentences are indexed so that the order of the sentences is known which enables the target sentence corresponding to each source sentence to be identified.

Figure 4C:
FIG. 4C shows an example of converting an extractive summary in a source language to an extractive summary in a target language.

At the same time, the control component 404 causes the summarization component 410 to generate an extractive summary of the article in the source language. In various implementations, the source sentences of the source article are provided to the summarization component 410 which utilizes an extractive summarization algorithm to select the source sentences to use in the extractive summary. Referring to FIG. 4C, an example schema of a source extractive summary 436 is shown in which the first, third, fifth, and seventh sentences of the source article were selected for the extractive summary. Any suitable extractive summary algorithm may be used. The control component 404 receives the extractive summary in the source language and identifies which sentences from the source article were selected for the summary. The control component 404 then selects the corresponding target language sentences to generate the extractive summary in the target language. In the example of FIG. 4C, the first, third, fifth, and seventh sentences from the target language translation of the article are selected for the extractive summary 438 in the target language. The target language extractive summary is then provided to the auto-read component 412 which causes the TTS model 418 to generate audio for the summary. The summary text and summary audio are then returned to the user interface where the summary text can be displayed, and playback of the audio can be controlled.

The system also enables summarizations of articles where translation is not requested but the article is in a language which is not supported by generative AI. In this case, the control component 404 identifies that the target language and the source language are the same, and also identifies that the source language of the article is not supported by the generative AI model(s) 416. In this case, the control component 404 is configured to identify an intermediate language into which the source article can be translated and that is supported by generative AI for summarization. The control component 404 then provides the source article to the translation component 408 along with instructions for translation into the intermediate language. The translation component 408 provides the source text and the intermediate language to the MT model(s) 414 which translates the text into the intermediate language. The translated text of the article in the intermediate language is then provided to the generative AI model(s) 416 which generates a summary of the article in the intermediate language. The summary of the article in the intermediate language is then returned to the translation component which translates the summary from the intermediate language to the source language. The source language summary is then provided to the auto-read component 412 which causes the TTS model 418 to generate audio for the summary. The summary text and summary audio are then returned to the user interface where the summary text can be displayed, and playback of the audio can be controlled. In a similar manner, the system enables translation of articles from a source language to a target language where neither the source language nor the target language is supported by generative AI. In this case, after the summary of the article is generated in the intermediate language, the control component 404 causes the translation component 408 to generate a summary of the article in the target language. The summary text and summary audio are then returned to the user interface where the summary text can be displayed, and playback of the audio can be controlled.

In some cases, the system can elect to use an intermediate language for summarization even if there is a generative AI capable of generating summaries in the source language. An intermediate language may be selected in any suitable manner. In various implementations, the resource levels of languages, relatedness of languages, generative AI capabilities for different languages, and the like may be taken into consideration in determining whether or not to use an intermediate language which language to use as an intermediate language for summarization.

FIG. 5 shows an example flowchart of a method 500 of facilitating consumption of online content. The method begins with receiving source text for a source article to be translated from a source language to a target language (block 502). The source language and target language for the translation of the source text is identified (block 504). The source text, the source language, and the target language is then provided to a machine translation model which automatically generates translated text in the target language from the source text (block 506). The translated text is then provided as input to a generative language model which generates summary text in the target language from the translated text (block 508). The summary text is then provided to a text-to-speech model which generates summary audio from the summary text (block 510). The summary text and the summary audio are then provided to a user interface via which the summary text is displayed, and playback of the summary audio is enabled (block 512).

Figure 6:
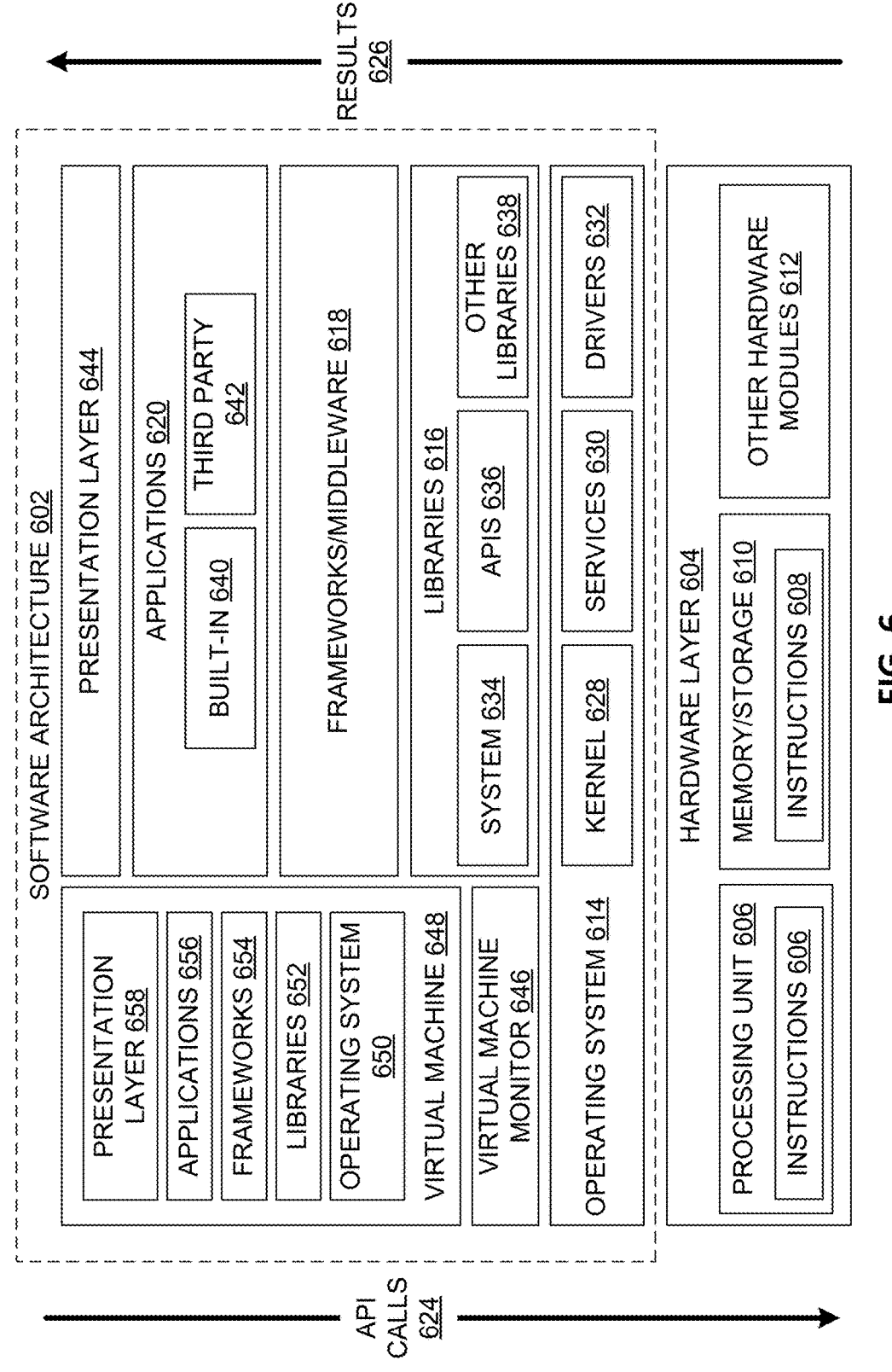
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
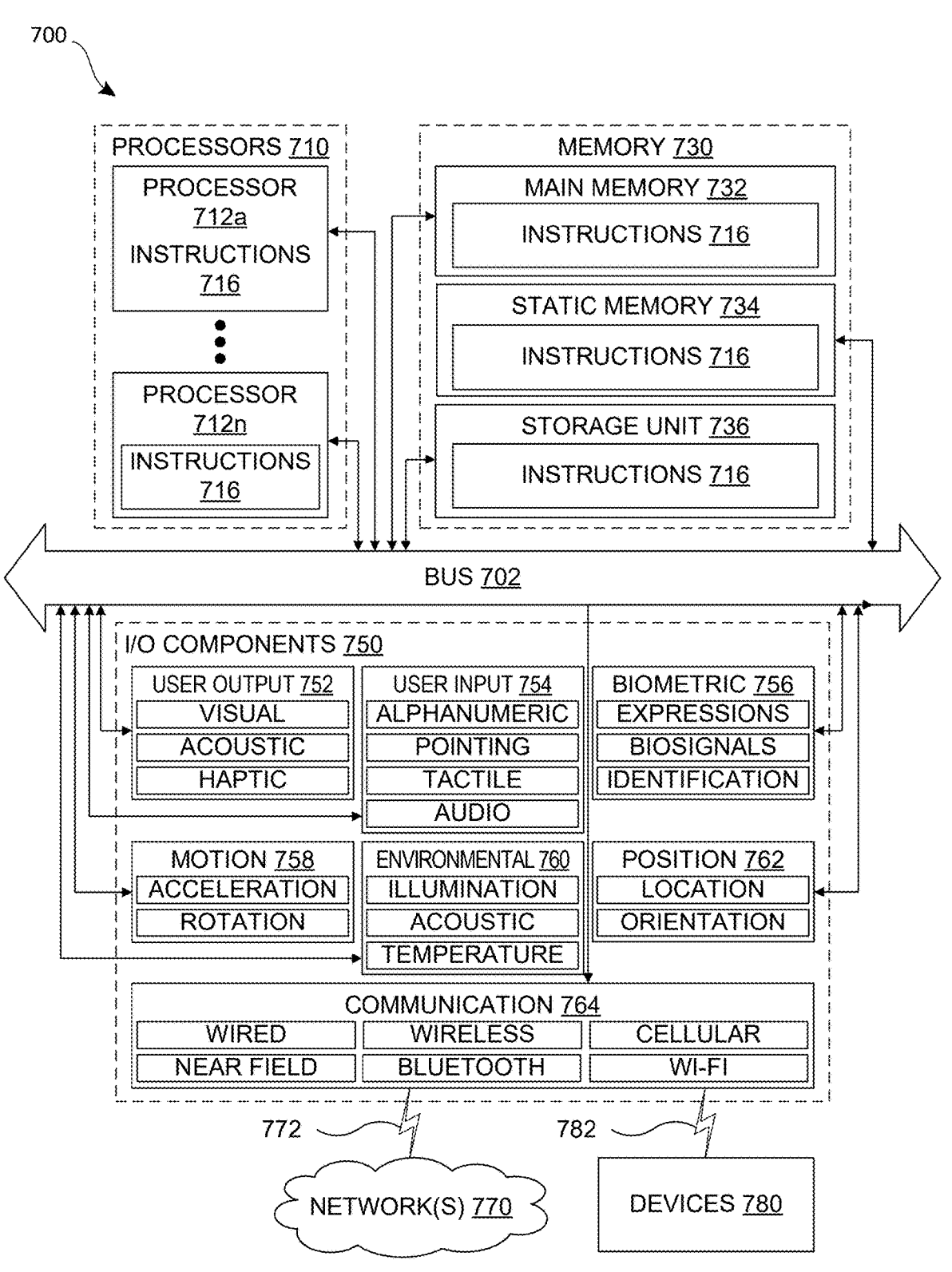
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions

716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per sc.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A translation, summarization, and auto-read system that reduces network bandwidth and computation resources associated with translation and summarization of an online content, the translation, summarization, and auto-read system comprising:

a processor; and a memory in communication with the processor, the memory comprising executable instructions that, when executed by the processor alone or in combination with other processors, cause the translation, summarization, and auto-read system to perform functions of:

receiving, at a control component from a user interface component, source text in a source language of an article to be translated and an indication of a target language for translating the source text;

providing, from the control component to a source language identification component, the source text;

receiving from the source language identification component a source language of the source text;

providing, from a translation component to a machine translation model, the source text, the target language, and the source language;

in response to providing the source text, the source language, and the target language to the machine translation model, receiving translated text of the article in the target language from the machine translation model;

determining, using the control component, whether the target language is supported by generative model summarization;

in response to determining that the target language is supported by generative model summarization:

providing, from a summarization component to a generative summarization model trained in the target language, the translated text; and in response to providing the translated text to the generative summarization model trained in the target language, receiving an extractive summary of the article in the target language from the generative summarization model trained in the target language;

in response to determining that the target language is not supported by generative model summarization:

providing, from the summarization component to a generative summarization model trained in the source language, the source text of the article in the source language;

in response to providing the source text of the article in the source language to the generative summarization model trained in the source language, receiving an extractive summary of the article in the source language from the generative summarization model trained in the source language; and converting, by the control component, the extractive summary in the source language to the extractive summary in the target language;

providing, from the control component to a text-to-speech model, the extractive summary in the target language;

in response to providing the extractive summary to the text-to-speech model, receiving summary audio for in the target language from the text-to-speech model;

providing, from the control component to a user interface, the extractive summary in the target language and the summary audio; and causing a display of the extractive summary in the target language and playback of the summary audio in the user interface.

2. The translation, summarization, and auto-read system of claim 1, wherein, when the target language is not supported by generative model summarization:

the machine translation model generates a sentence-to-sentence translation of the article in the source language that results in a target language sentence being generated for each source language sentence in the article, and the generative summarization model uses an extractive summary algorithm to select source language sentences from the sentence-to-sentence translation to use for the extractive summary in the source language.

3. The translation, summarization, and auto-read system of claim 2, wherein:

the control component selects target language sentences corresponding to the selected source language sentences to use in the extractive summary in the target language.

4. The translation, summarization, and auto-read system of claim 1, wherein Large Language Models (LLMs) are used for generative summarization models.

5. The translation, summarization, and auto-read system of claim 1, wherein the user interface is displayed in association with the article on a client device.

6. The translation, summarization, and auto-read system of claim 5, wherein the user interface is configured to receive user input indicating the target language for translation.

7. The translation, summarization, and auto-read system of claim 5, wherein the user interface includes user interface controls for starting and stopping the playback and controlling a speed of the playback.

8. The translation, summarization, and auto-read system of claim 1, wherein the source language is determined from the source text using a language identification model.

9. A method for summarizing online content that reduces network bandwidth and computation resources associated with translation and summarization of an online content, the method comprising:

receiving, at a control component from a user interface component, source text in a source language of an article to be translated;

providing, from the control component to a source language identification component, the source text;

receiving a source language of the source text from the source language identification component;

determining, using the control component, an intermediate language for summarization of the source text;

providing, from a translation component to a machine translation model trained in the intermediate language, the source text;

receiving translated text of the article in the intermediate language from the machine translation model;

providing, from a summarization component to a generative summarization model trained in the intermediate language, the translated text of the article in the intermediate language;

receiving a summary of the article in the intermediate language from the generative summarization model;

providing, from the translation component to the machine translation model, the summary in the intermediate language;

receiving a summary of the article in the source language from the machine translation model;

providing, from an auto-read component to a text-to-speech model, the summary in the source language;

in response to providing the summary in the source language from the auto-read component to the text-to-speech model, receiving summary audio in the source language; and providing, from the control component to a user interface, the summary in the source language and the summary audio; and displaying the summary in the source language and enabling playback of the summary audio in a user interface.

10. The method of claim 9, wherein determining the intermediate language for summarization further comprises:

determining, using the control component, whether the source language is supported by generative model summarization; and determining, using the control component, the intermediate language for summarization when the source language is not supported by generative model summarization.

11. The method of claim 10, wherein the generative summarization model is trained to generate the summary text using an extractive summarization technique.

12. The method of claim 9, wherein the source text is received from a user interface component, the user interface component being displayed in association with a source article which includes the source text.

13. The method of claim 12, further comprising:

displaying the summary text on a display screen; and controlling the playback of the summary audio via the user interface.

14. The method of claim 9, further comprising:

processing the source text using a language identification model to determine the source language of the source text.

15. A non-transitory computer readable medium on which are stored instructions that, when executed, cause a programmable device to perform functions of:

receiving, at a control component from a user interface component, source text in a source language of an article to be translated and an indication of a target language for translating the source text;

providing, from the control component to a source language identification component, the source text;

in response to providing the source text to the source language identification component, receiving from the source language identification component a source language of the source text;

determining, using the control component, whether the target language is supported by generative model summarization;

providing, from a translation component to a machine translation model, the source text, the target language, and the source language;

in response to providing the source text, the source language, and the target language to the machine translation model, receiving translated text of the article in the target language from the machine translation model;

in response to determining that the target language is supported by generative model summarization:

providing, from a summarization component to a generative summarization model trained in the target language, the translated text;

in response to providing the translated text to the generative summarization model trained in the target language, receiving an extractive summary of the article in the target language;

in response to determining that the target language is not supported by generative model summarization:

providing, from the summarization component to a generative summarization model trained in the source language, the source text of the article in the source language;

in response to providing the source text of the article in the source language to the generative summarization model trained in the source language, receiving an extractive summary of the article in the source language; and converting, by the control component, the extractive summary in the source language to the extractive summary in the target language;

providing, from the control component to a text-to-speech model, the extractive summary in the target language;

in response to providing the extractive summary to the text-to-speech model, receiving summary audio for in the target language from the text-to-speech model;

providing, from the control component to a user interface, the extractive summary in the target language and the summary audio; and causing the extractive summary in the target language to be displayed and the summary audio to be played in a user interface.

16. The non-transitory computer readable medium of claim 15, wherein, when the target language is not supported by generative model summarization:

the machine translation model generates a sentence-to-sentence translation of the source article in the source language that results in a target language sentence being generated for each source language sentence in the source article, and the generative summarization model uses an extractive summary algorithm to select source language sentences from the sentence.

17. The non-transitory computer readable medium of claim 16, wherein:

the control component selects target language sentences corresponding to the selected source language sentences to use in the extractive summary in the target language.

18. The non-transitory computer readable medium of claim 15, wherein Large Language Models (LLMs) are used for generative summarization models.

19. The non-transitory computer readable medium of claim 15, wherein the user interface is displayed in association with the source article on a client device.

20. The non-transitory computer readable medium of claim 19, wherein the user interface is configured to receive user input indicating the target language for translation.

* * * * *